United States Patent [19]

Yen

[11] Patent Number: 5,039,269

[45] Date of Patent: Aug. 13, 1991

[54] MULTI-STORY TYPE AUTOMATIC PARKING LOT FOR DENSE PARKING

[76] Inventor: Tai C. Yen, No. 370, Chung Hua Road, Sec. 2, Taipei, Taiwan

[21] Appl. No.: 486,997

[22] Filed: Mar. 1, 1990

[51] Int. Cl.$^5$ ............................................. E04H 6/34
[52] U.S. Cl. ..................................... 414/236; 414/239
[58] Field of Search ............... 414/231, 232, 233, 234, 414/236, 237, 239, 240, 241, 252, 266, 273, 286; 198/372, 465.2, 786, 787; 193/35 MD

[56] References Cited

U.S. PATENT DOCUMENTS

| | | | |
|---|---|---|---|
| 2,216,637 | 10/1940 | Auger et al. | 414/252 X |
| 2,258,530 | 10/1941 | Auger et al. | 414/252 X |
| 3,662,905 | 5/1972 | Mizuno et al. | 414/237 |
| 3,710,917 | 1/1973 | Black et al. | 198/787 X |
| 4,019,627 | 4/1977 | Eggert et al. | 198/787 X |

Primary Examiner—David A. Bucci
Assistant Examiner—James Keenan
Attorney, Agent, or Firm—Lowe, Price, LeBlanc & Becker

[57] ABSTRACT

A multi-story type automatic parking lot for dense parking, permitting the parked vehicles to be closely arranged with one adjacent to another without any passage way required. Every parking unit is made of a steel plate which comprises a plurality of rolling wheels peripherally on its bottom so that it can be supported and carried by a plurality of transmission mechanisms, which are longitudinally and transversely mounted on the ground of each floor of the parking lot and controlled by a central computer control system, to change position parking unit by parking unit.

2 Claims, 8 Drawing Sheets

| 25 | | |
|---|---|---|
| 24 | | |
| 23 | | |
| 22 | | |
| 21 | | |
| 20 | | |
| 19 | | |
| 18 | | |
| 17 | | |
| 16 | | |
| 15 | | |
| 14 | | |
| 13 | | |
| 12 | | |
| 11 | | |
| 10 | | |
| 9 | | |
| 8 | | |
| 7 | | |
| 6 | | |
| 5 | | |
| 4 | | |
| 3 | | |
| 2 | | |
| 1 | | |

FIG·7

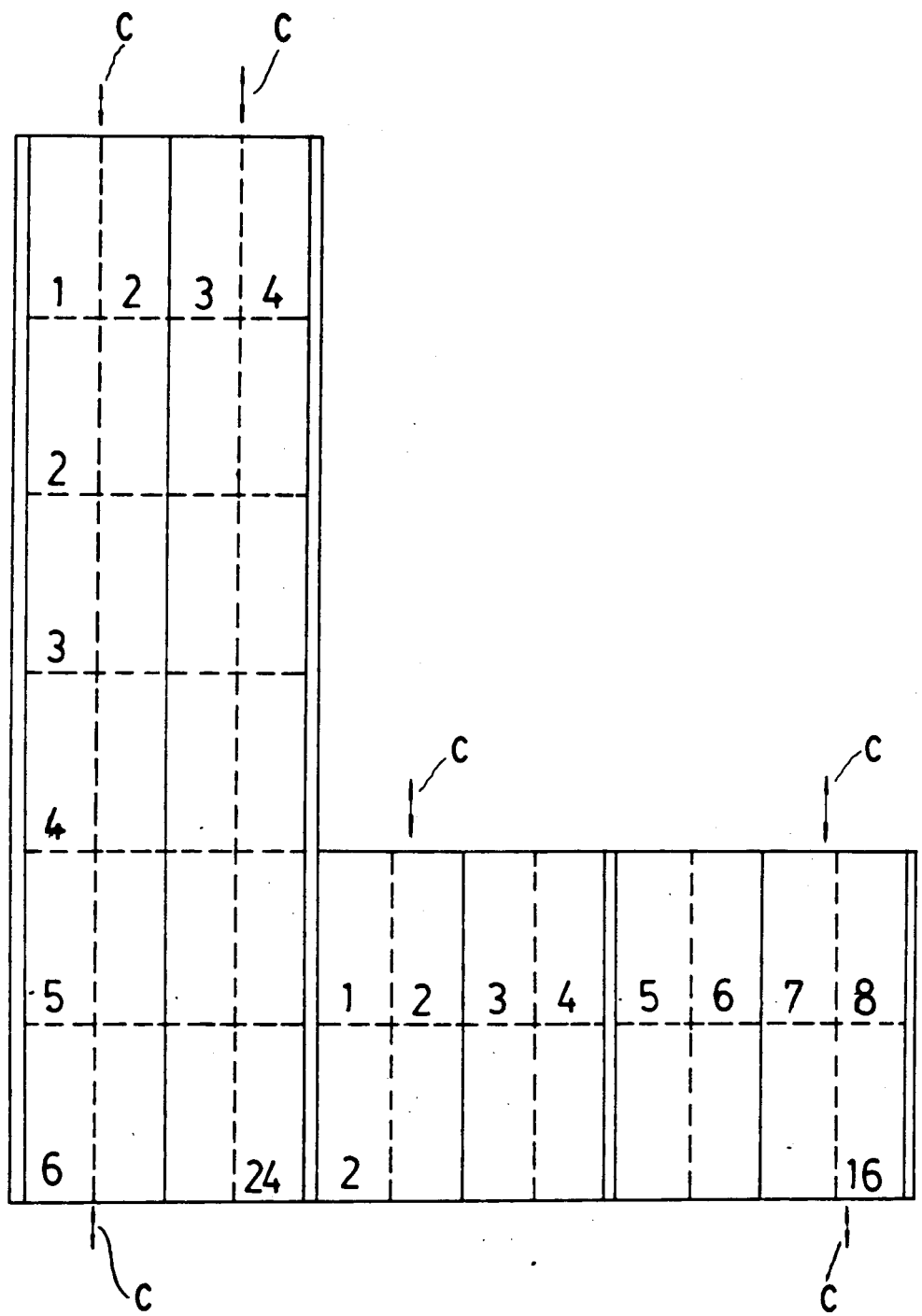
FIG·8

016F3269

MULTI-STORY TYPE AUTOMATIC PARKING LOT FOR DENSE PARKING

BACKGROUND OF THE INVENTION

Automobiles are an important means for carrying or conveying persons over land. As a consequence of the use of automobiles, parking problems follow to trouble car drivers. The problem is particularly serious in downtown areas. In order to fully utilize the land, a variety of multi-story parking lots are built in every city. In a conventional multi-story parking lot, a rotary intersection and passage way must be provided for entrance or exit. Due to the limitation of rotary intersections and passage ways, surface space can not be fully utilized. Therefore, a multi-story parking lot occupies a big area for the construction, and is more difficult to construct and maintain (its embedded bearings and shock absorbing installation).

It is an object of the present invention to provide a multi-story type parking lot for dense parking, which can minimize space occupation and provide maximized parking area.

Another object of the present invention is to provide a multi-story type parking lot for dense parking, which is inexpensive to construct, easy to maintain and practical in use.

Still another object of the present invention is to provide a multi-story type parking lot for dense parking, which can be constructed on a fragmented land.

SUMMARY OF THE INVENTION

The present invention is to provide a multi-story type automatic parking lot for dense parking, which permits vehicles to closely park together with one adjacent to another without the need for any passage way therein, and in which every parking unit can be driven to change position parking unit by parking unit, so as to respectively carry a vehicle to move in or out. The position change of each parking unit is supported and operated by means of transmission mechanisms longitudinally and transversely mounted on each floor surface of the parking lot and controlled by a central computer control system. The transmission mechanisms comprise each a plurality of transmission gears having a plurality of oval-shaped rollers equidistantly on its circumference. The oval-shaped rollers of a transmission gear are not in alignment with the ones of a adjacent transmission gear such that each steel plate of parking unit is alternatively supported by the transmission gears and allowed to move transversely and longitudinally.

BRIEF DESCRIPTION OF THE DRAWINGS

The present invention will now be described by way of example, with reference made to the annexed drawings, in which:

FIGS. 6 through 8 are schematic plan views, illustrating the arrangement of various multi-story parking lots according to the present invention, FIG. 6A being a typical floor of the parking lot of FIG. 6.

DETAILED DESCRIPTION OF THE PREFERRED EMBODIMENTS

Figure 5:
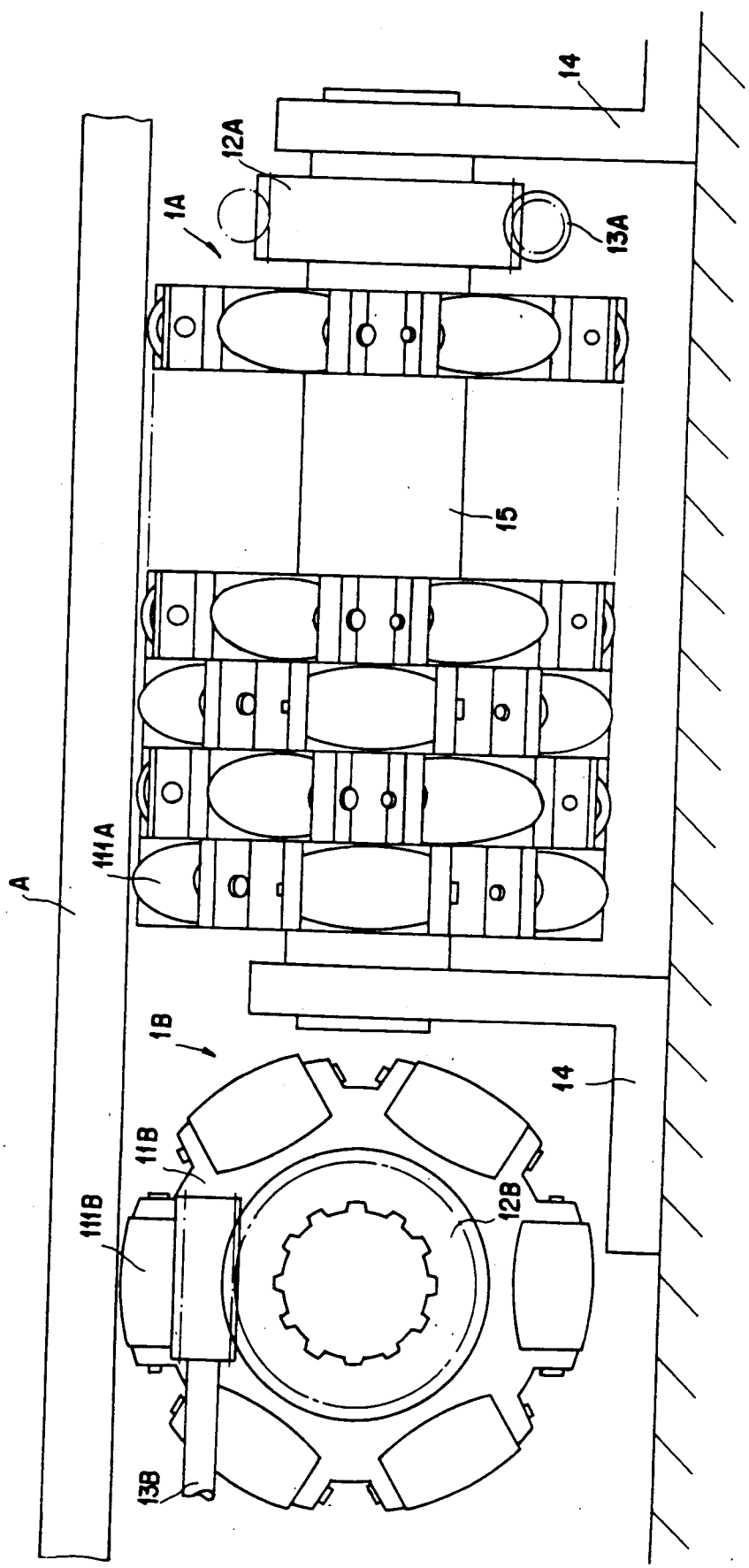
FIG. 5 illustrates the arrangement of one transmission mechanism in vertical to another transmission mechanism.
Figures 6, 6A:
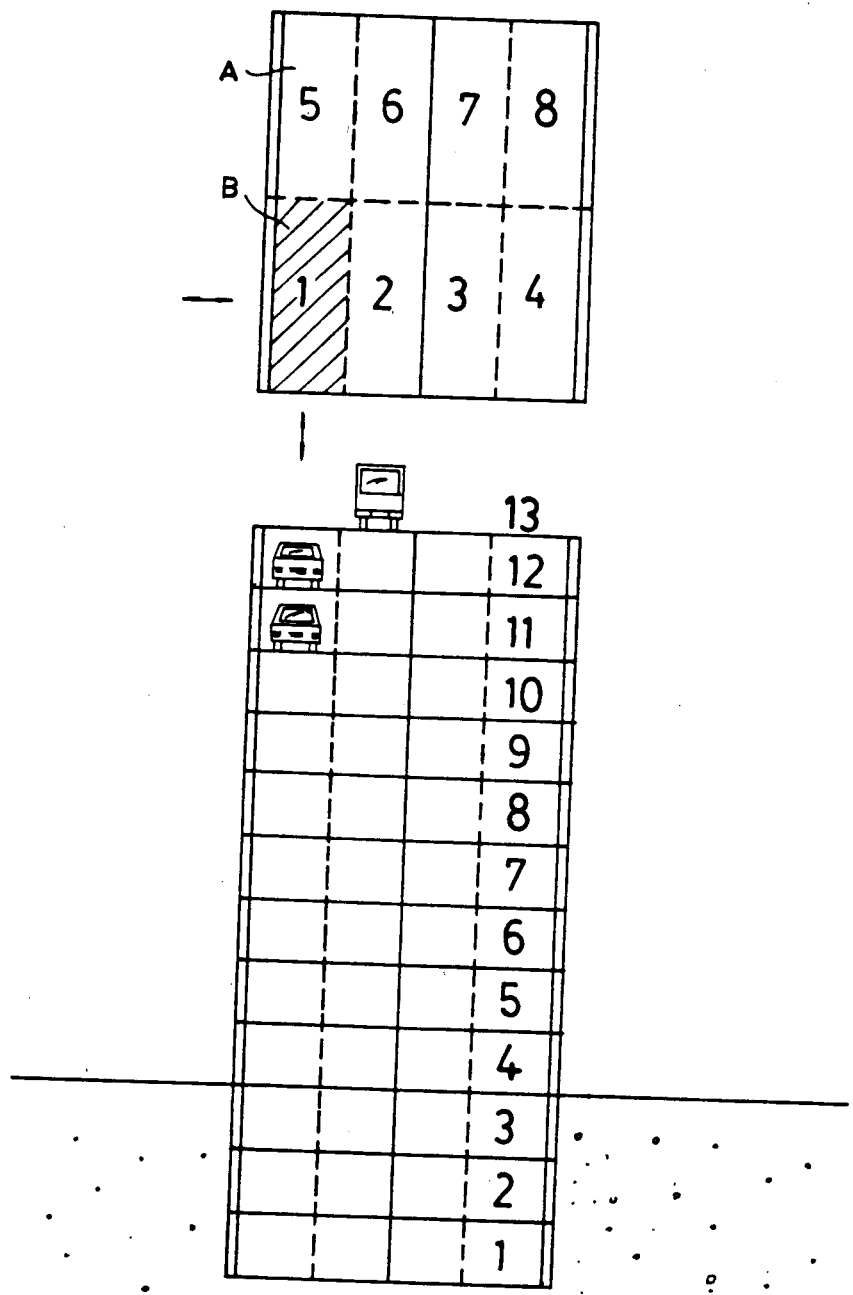

Referring to FIGS. 5 and 6A, a plurality of parking units (A) are made on each floor of a building adjacent to one another, in which each parking unit (A) is made of steel plate having pulley wheels or rolling balls peripherally mounted on its bottom so that it is permitted to slide transversely or longitudinally. Among the parking units (A) on each floor (in the present embodiment, there are 8 parking units prepared on each floor), there is one (B) left empty for car lift. Because the building is specifically prepared for the parking of cars, the height of each floor is designed at 1.8M, and the size of each parking unit (A) is designed at 5.2M×2.2M sufficient for the parking of limousines and regular commercial cars. Therefore, a building in height equivalent to a regular 5-story house can be constructed to provide 9 stories of parking floor above the ground, 3 stories under the ground, as well as one parking floor on the top for buses, i.e. there are a total of 102 parking units available in a building of 16.2M high. According to the aforesaid arrangement, a building of 36M in height (equivalent to a 12-story building) can provide 20 stories of parking floor above the ground, 5 stories of parking floor within 9M under the ground (equivalent to regular 3 stories of basement floor). Therefore, there are total 1800 parking units which can be provided within an area of 32.8M×28M (including the thickness of wall and ceiling). Its parking capacity is approximately 18 times over the conventional method. According to precise estimation, the cost of each parking unit is just about one eighteenth or one twentieth of the conventional one. Because there is neither a passage way nor a rotary intersection required in the present invention, any hill-side or fragmented land can be fully utilized, and access doors can be made at various locations (see the arrows C in FIG. 8).

As an alternate form of the present invention, the size of each parking unit may be variously embodied so as to fit for different purposes, for example, for parking motorcycles. The present invention is not confined to a multi-story parking lot. Any building can be partly reconstructed to provide a specific parking area for parking transportation vehicles.

Figure 4:
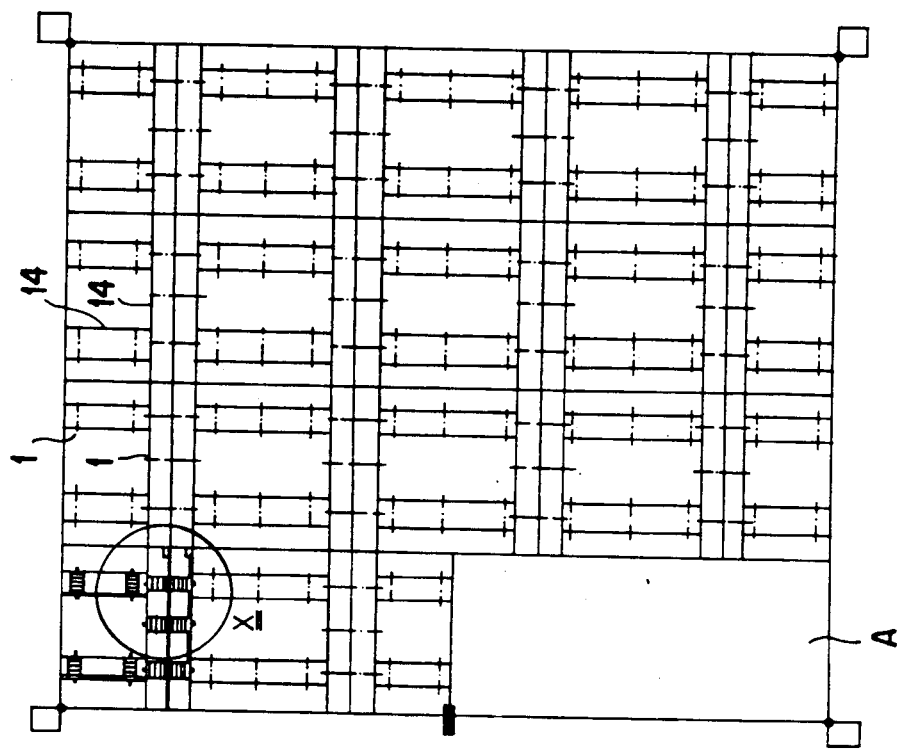
FIG. 4 is a schematic drawing and FIG. 4A is a partly enlarged view, illustrating a standard arrangement of transmission mechanisms and steel plates of parking units on a floor of a parking lot according to the present invention.
Figure 4A:
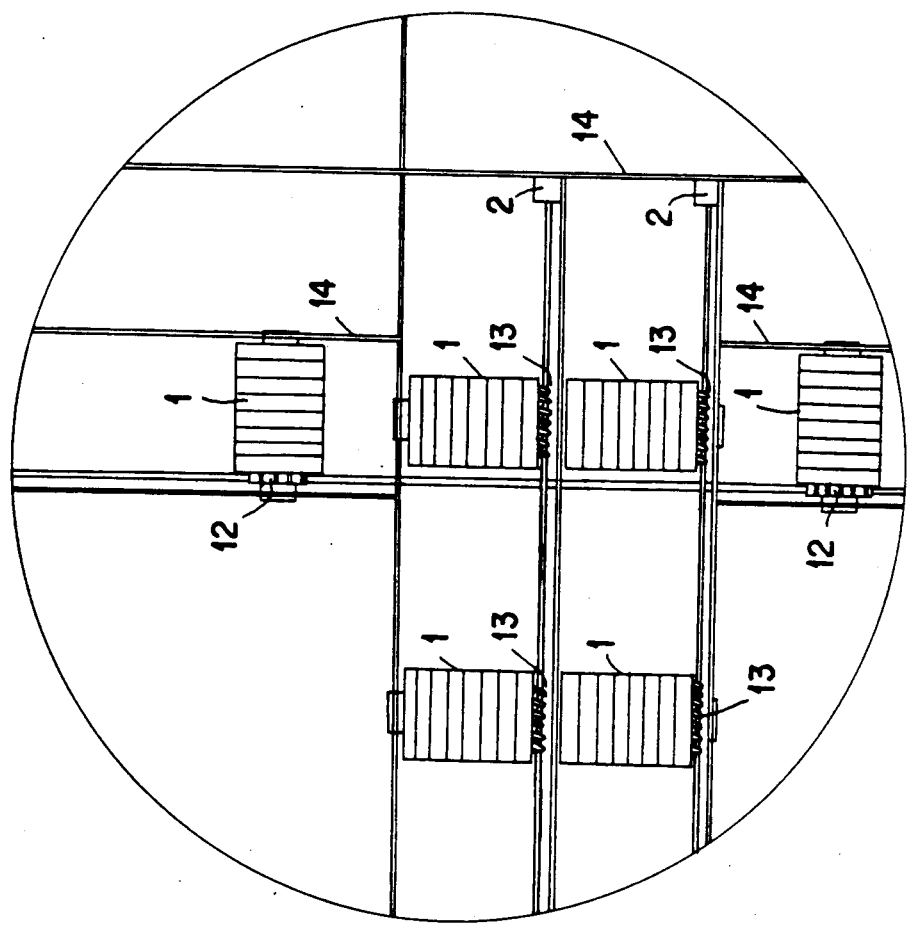

Referring to FIGS. 4, 4A and 5, the position change of each parking unit (A) is operated by means of a transmission mechanism (1) which is set below each parking unit (A) and controlled by a central computer control system.

Figure 1:
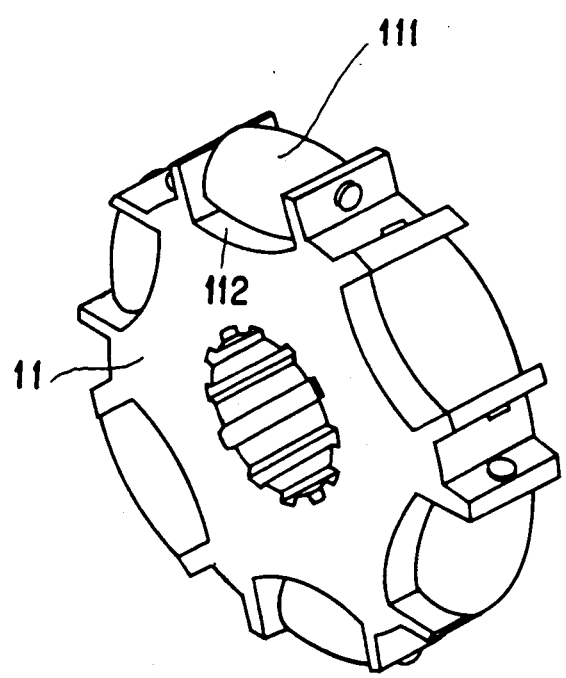
FIG. 1 is a perspective schematic drawing of a transmission gear according to the present invention.
Figure 2:
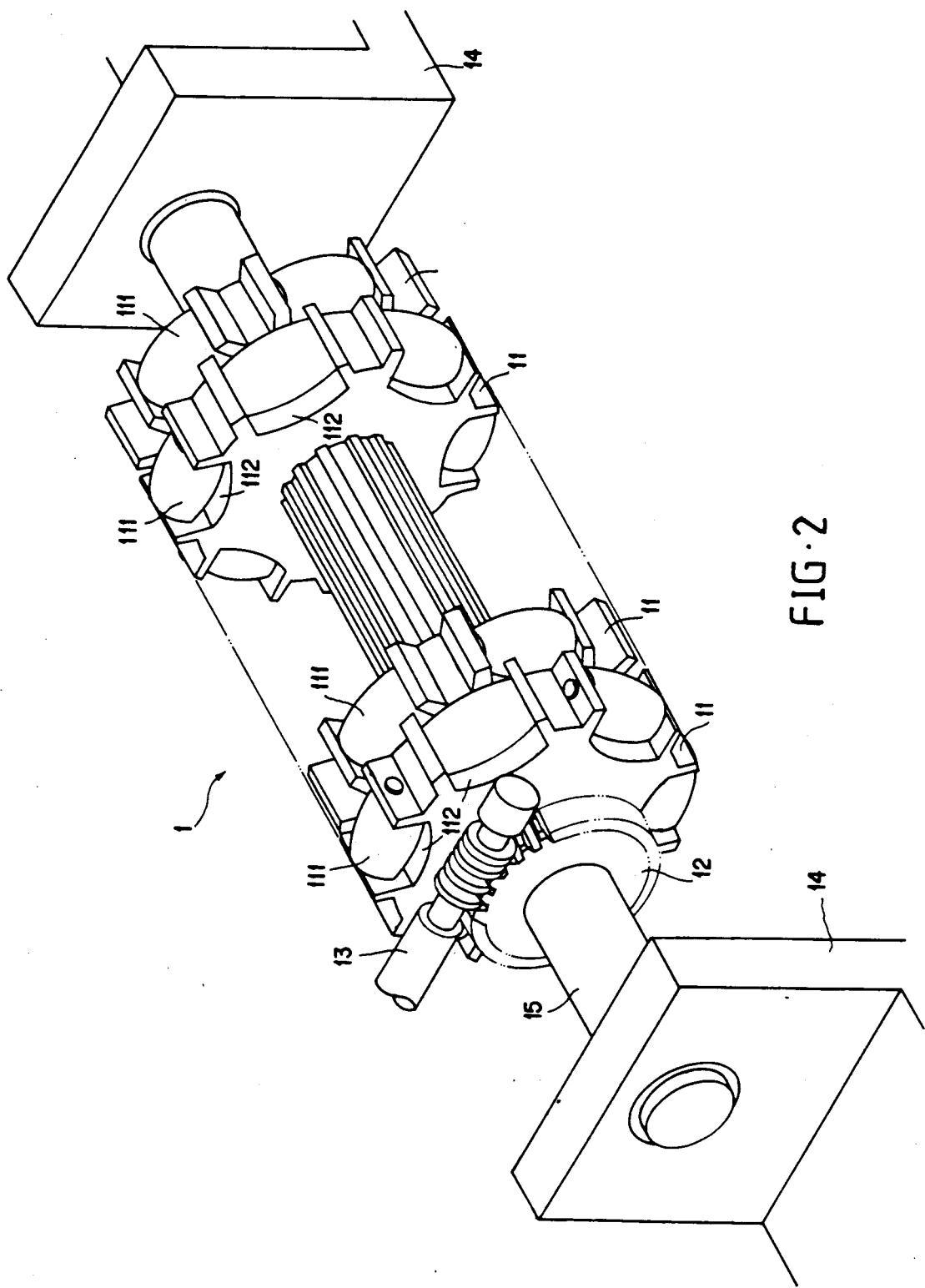
FIG. 2 is a perspective view of a transmission mechanism according to the present invention.

Referring to FIGS. 1 and 2, a transmission mechanism (1) according to the present invention is comprised of a plurality of transmission gears (11) connected in series, wherein the transmission gears (11) comprise each a plurality of recessed portions (112) equidistantly made on its circumference and having each an oval-shaped roller (111) revolvably secured thereto. According to the present invention an oval-shaped roller (111) is most preferably covered with one layer of wear resistant rubber to ensure maximum durability and performance. The largest part of each oval-shaped roller (111)

Figure 3:
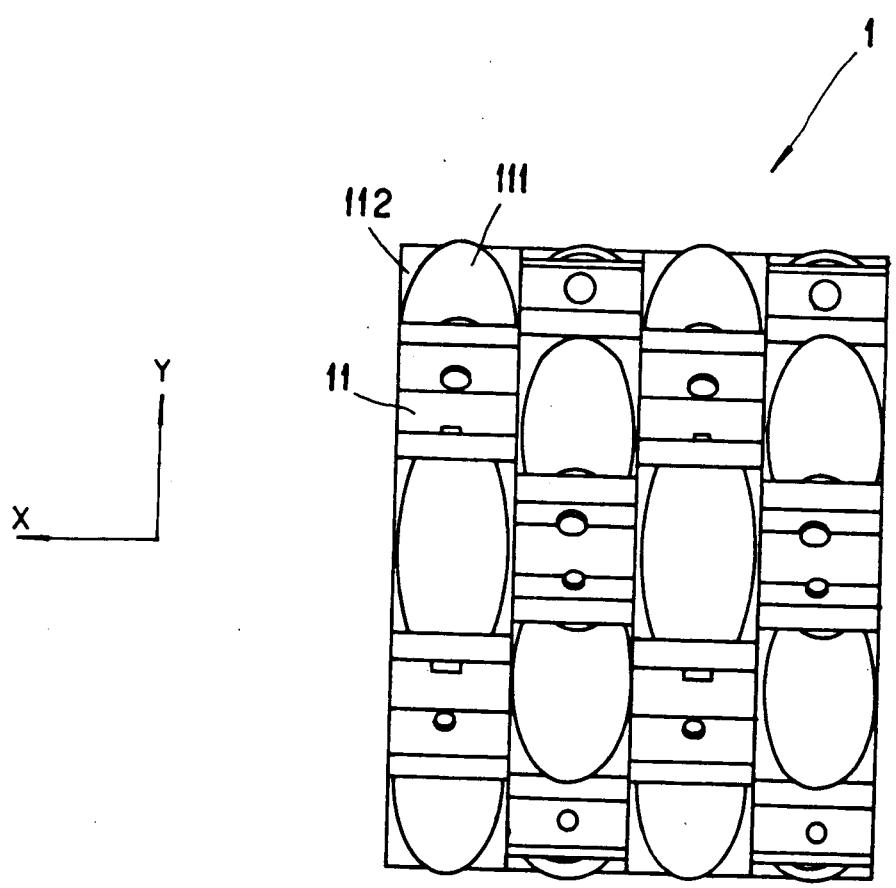
FIG. 3 illustrates the operation of a transmission mechanism according to the present invention.

(i.e. its middle part) has a diameter slightly larger than the depth of each recessed portion (112) such that the oval-shaped rollers (111) of each transmission gear (11) are allowed to alternatively contact a corresponding steel plate (A). See FIG. 5. Referring to FIGS. 2, 3 and 5, the transmission gears (11) of the transmission mechanism (1) of the steel plate (A) of parking unit are connected in series, wherein the oval-shaped rollers (111) of one transmission gear (11) are not in alignment with the oval-shaped rollers (111) of an adjacent transmission gear (11). The arrangement of not allowing the oval-shaped rollers of one transmission gear to be in alignment with that of an adjacent transmission gear is for the following two purposes: <1> When the transmission mechanism (1) rotates along radial direction (Y) there is always an oval-shaped roller (111) stopped against the steel plate (A) through all angles; and <2> When another transmission mechanism (1B) which is mounted perpendicular to mechanism (1A) rotates, its oval-shaped rollers (111B) rotate along a perpendicular axial direction (X) (see FIGS. 3 and 5), and with the first transmission mechanism (1A), the oval-shaped rollers (111A) or (111B) move a steel plate (A) in a desired direction, i.e., (X) or (Y).

Referring to FIGS. 2 and 5 again, each transmission mechanism (1) comprises a revolving shaft (15) set between two L-shaped frames (14), which are fixedly secured to the ground, and driven to rotate by means of a motor through a worm (13) and a worm gear (12). According to the present invention, the connection of the revolving shaft (15) with the two L-shaped frames (14) is most preferably made by means of roller bearings. As illustrated, the worms (13A) (13B) of the transversely and longitudinally disposed transmission mechanisms (1A) (1B) are respectively engaged with worm gears (12A) (12B) at different level positions to not interfere with the operation of each other.

The arrangement of transmission mechanisms (1) beneath parking units (A) on each floor of a parking lot according to the present invention can be apparently seen from the annexed drawing of FIG. 4. As illustrated, there are transmission mechanisms (1) longitudinally and transversely set in each zone, and two or three transmission mechanisms are controlled by a common motor (2). Through computer control, a steel plate (A) can be shifted to an exit parking unit by parking unit.

As described above, the present invention utilizes simple transmission mechanism to efficiently deliver and change parking units so that minimized parking space occupation can be achieved. The present invention is not only practical for use in vehicle parking, it can also be used in warehouse stockroom control as well as container terminal administration.

What is claimed is:

1. A multi-story type automatic parking lot for dense parking, including a plurality of parking units horizontally arranged on each floor thereof with one adjacent another with a single open space the size of one unit, said parking units each being comprised of a steel plate, and a plurality of transmission mechanisms transversely and longitudinally secured to the ground of each floor thereof to support and move said steel plate to change position parking unit by parking unit, said transmission mechanisms each being comprised of a plurality of transmission gears connected in series, said transmission gears comprising each a plurality of recessed portions equidistantly made on its circumference and having each an oval-shaped roller revolvably secured thereto; wherein the largest part of each oval-shaped roller has a diameter slightly larger than the depth of each recessed portion such that the oval-shaped rollers of each transmission gear are allowed to alternatively contact said steel plate; and wherein the oval-shaped rollers of one transmission gear are not in alignment with the oval-shaped rollers of an adjacent transmission gear said transmission mechanisms being alternatively set longitudinally and transversely, each of which is respectively driven to rotate by means of a worm engaged with a worm gear so as to drive said steel plates to displace longitudinally or transversely parking unit by parking unit.

2. A multi-story type automatic parking lot as claimed in claim 1, wherein said oval-shaped rollers are each covered with one layer of wear resistant rubber to ensure maximum durability and performance.

* * * * *